United States Patent [19]

Takata

[11] Patent Number: 5,474,148
[45] Date of Patent: Dec. 12, 1995

[54] BICYCLE WITH ELECTRIC MOTOR

[75] Inventor: Nozomu Takata, Iwata, Japan

[73] Assignee: Yamaha Hatsudoki Kabushiki Kaisha, Iwata, Japan

[21] Appl. No.: 128,866

[22] Filed: Sep. 29, 1993

[30] Foreign Application Priority Data

Sep. 30, 1992 [JP] Japan .................. 4-285432

[51] Int. Cl.⁶ .................. B62K 11/00; B62M 23/02
[52] U.S. Cl. .................. 180/206; 180/207; 180/220; 180/65.2; 280/214
[58] Field of Search .................. 180/219, 220, 180/226, 205, 206, 207, 65.2, 65.6, 65.1; 280/212, 214, 215

[56] References Cited

U.S. PATENT DOCUMENTS

| | | | |
|---|---|---|---|
| 3,513,928 | 9/1968 | Emmons | 180/206 |
| 3,773,131 | 11/1973 | Jaulmes | 180/206 |
| 3,939,932 | 2/1976 | Rosen | 180/206 |
| 4,122,907 | 10/1978 | Davidson et al. | 180/206 |
| 4,364,448 | 12/1982 | Ikuma | 180/206 |
| 5,024,286 | 6/1991 | Lean et al. | 180/206 |
| 5,226,501 | 7/1993 | Takata | 180/220 X |

FOREIGN PATENT DOCUMENTS

| | | | |
|---|---|---|---|
| 0222179 | 5/1987 | European Pat. Off. . | |
| 0559231 | 9/1993 | European Pat. Off. . | |
| 0443948 | 9/1967 | Switzerland | 180/206 |
| 1559822 | 1/1980 | United Kingdom | 180/206 |

OTHER PUBLICATIONS

Patent Abstracts of Japan, vol. 14, No. 113 (M–0944) 2 Mar. 1990 & JP-A-01 314 685 (Japan II M KK) 19 Dec. 1989.

*Primary Examiner*—Margaret A. Focarino
*Assistant Examiner*—F. Zeender
*Attorney, Agent, or Firm*—Knobbe, Martens, Olson & Bear

[57] ABSTRACT

A pedal operated vehicle such as a bicycle having an electric motor assist. The assist ratio provided by the electric motor may be varied in response to a variety of vehicle conditions such as speed so as to reduce the consumption of electrical energy and to avoid over speed conditions. Various control ratio options are depicted and an embodiment is also shown wherein the operator may select the assist ratio or assist ratio curve provided.

24 Claims, 5 Drawing Sheets

5,474,148

BICYCLE WITH ELECTRIC MOTOR

BACKGROUND OF THE INVENTION

This invention relates to a bicycle with an electric motor and more particularly to an improved electrically assisted, manually powered vehicle.

It has been proposed to extend the usefulness of pedal operated vehicles such as bicycles by incorporating an electric motor that provides a driving assist for the bicycle. Basically, this type of device operates so as to sense the force which the operator applies to the pedals and then apply an added electrical assist to the driven wheel of the vehicle. The amount of electrical assist applied is directly related to the power which the operator places on the pedals.

Of course, it is well known that the force applied by a rider to the pedals will vary cyclically during a single revolution due to the offset of the pedals from the rotational axis. Actually, the pedal force goes from zero (0) at top dead center and increases until the pedals and crank are at a 90° angle and then decreases back to zero (0) for each half revolution. As a result of this operation, the amount of pedal assist during a single crank cycle will vary in direct proportion, with conventional systems, to the operator force sensed at the pedals.

Normally, as has been noted, the assist rate $\eta$ is a constant and this assist rate is expressed by the following equation:

$\eta = F_M \div F_L$, where $F_L$ equals the manual force and $F_M$ equals the electric motor force.

There are a number of disadvantages with this constant pedal assist relationship.

For example, at low speeds it may be desirable to provide a large electric motor drive force and this results in the election of a large assist rate $\eta$. However, if this is used then when the vehicle is being driven at high speed, there will be high electrical energy applied and the speed may become excessive and cause excessive consumption of the battery.

Also, there may be other conditions when it is desired to reduce the assist force under some conditions, but maintain a higher assist force under other conditions.

It is, therefore, a principal object to this invention to provide an electrically assisted, manually powered vehicle such as a bicycle wherein the amount of assist force can be varied.

It is a further object to this invention to provide a vehicle of this type wherein the assist ratio is varied in response to sensed vehicle conditions such as speed.

It is a further object to this invention to provide an improved vehicle of this type wherein the assist ratio can be selectively controlled depending upon operator demand and desires.

SUMMARY OF THE INVENTION

This invention is adapted to be embodied in an electrically assisted, manually powered vehicle having at least one driven wheel. An operator driven driving member is coupled to the driven wheel for operator powered operation of the vehicle. Force sensing means sense the force applied by the operator to the operator driven driving member. An electric motor is provided for exerting a driving force on the vehicle and means responsive to the output of the force sensing means applies a driving force to the electric motor for electric motor assist to the driving of the Vehicle. Means are provided for selectively varying the amount of electric motor assist relative to the force sensed by the force sensing means.

DETAILED DESCRIPTION OF THE PREFERRED EMBODIMENTS OF THE INVENTION

Figure 1:
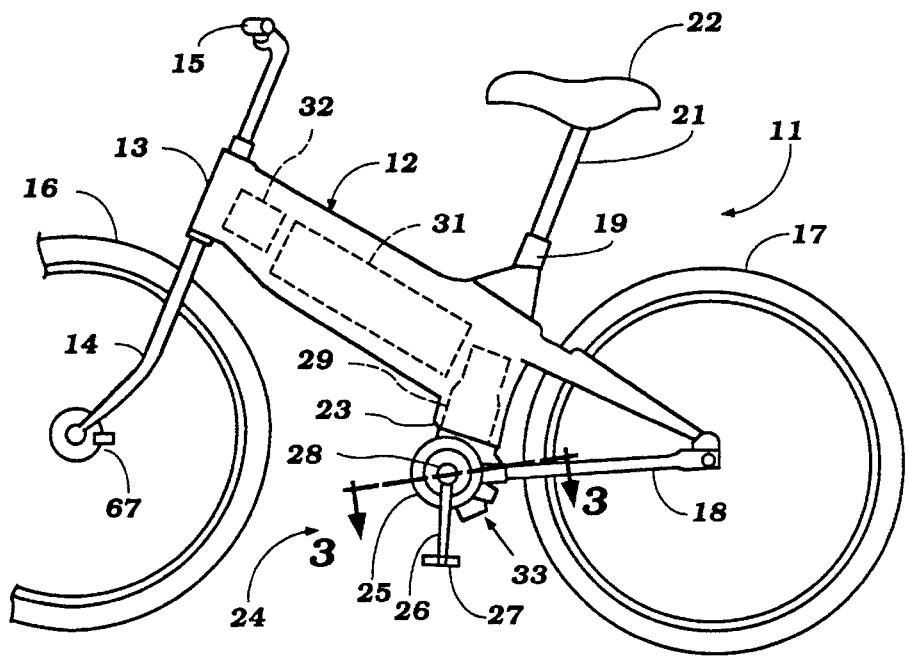
FIG. 1 is a side elevational view of a bicycle constructed and operated in accordance with an embodiment of the invention.

Referring first to FIG. 1, a bicycle constructed in accordance with an embodiment of the invention is identified generally by the reference numeral 11. The bicycle 11 includes a frame assembly, indicated generally by the reference numeral 12, having a head tube 13 which journals a front fork 14 for steering movement under the control of a handlebar 15. A front wheel 16 is rotatably journalled by the front fork 14 in a well known manner.

A rear wheel 17 is journalled at the rear end of the frame assembly 12 by means including a pair of rear stays 18 which extend on opposite sides of the rear wheel 17. One of the these stays 18 contains a drive for the rear wheel 17, as will be described.

A seat tube 19 is carried by the frame assembly 12 adjacent the rear wheel 17 and supports a seat post 21 upon which a saddle type seat 22 is positioned in a known manner.

Beneath the seat tube 19, the frame 12 is provided with a bottom bracket 23 which supports in part a drive mechanism, indicated generally by the reference numeral 24. The drive mechanism 24 is comprised of a manual drive consisting of a crank journalled in a case 25 which is fixed to the bottom bracket 23 by fasteners 20 (FIG. 3) and having a pair of crank arms 26 upon which pedals 27 are rotatably journalled in a known manner. The crank is connected to a crankshaft 28 for manual rotation of the rear wheel 17 in a manner which will be described.

In addition, an electric motor, indicated generally by the reference numeral 29 is accommodated in the lower bracket 23 and also is adapted to drive the rear wheel 17 in a manner which will be described. The electric motor 29 is powered by a rechargeable type of battery 31, such as a lead battery, and which is controlled by means of a controller 32, both of which are mounted in the upper portion of the frame assembly 12.

Figure 4:
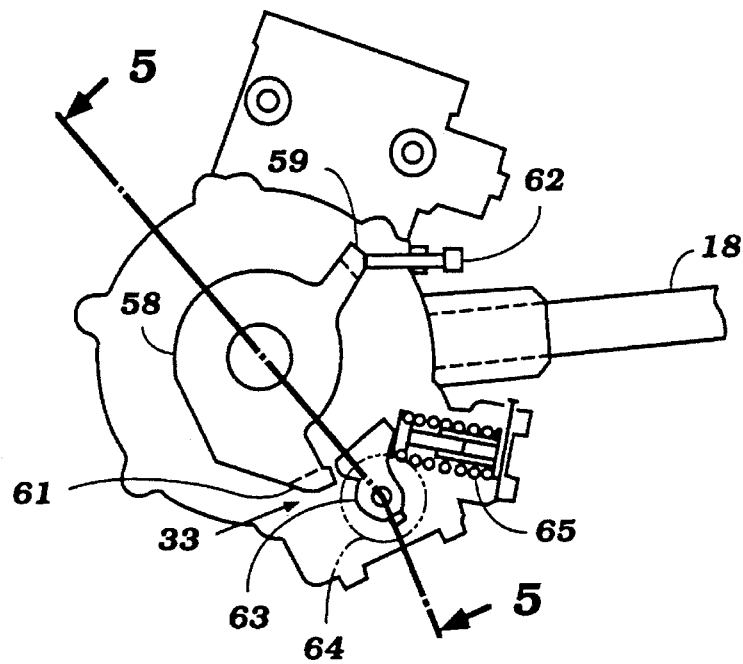
FIG. 4 is an enlarged side elevational view showing the relationship of the torque sensor to the other components.
Figure 5:
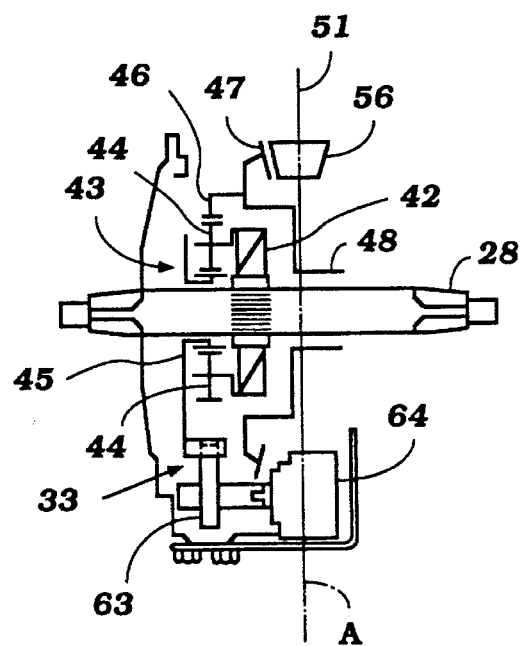
FIG. 5 is a cross sectional view taken along the line 5—5 of FIG. 4.

In addition, a pedal force sensor 33 is mounted on the crank assembly. The way in which the pedal force sensor 33 operates will be described later by particular reference to FIGS. 4 and 5.

Figure 2:
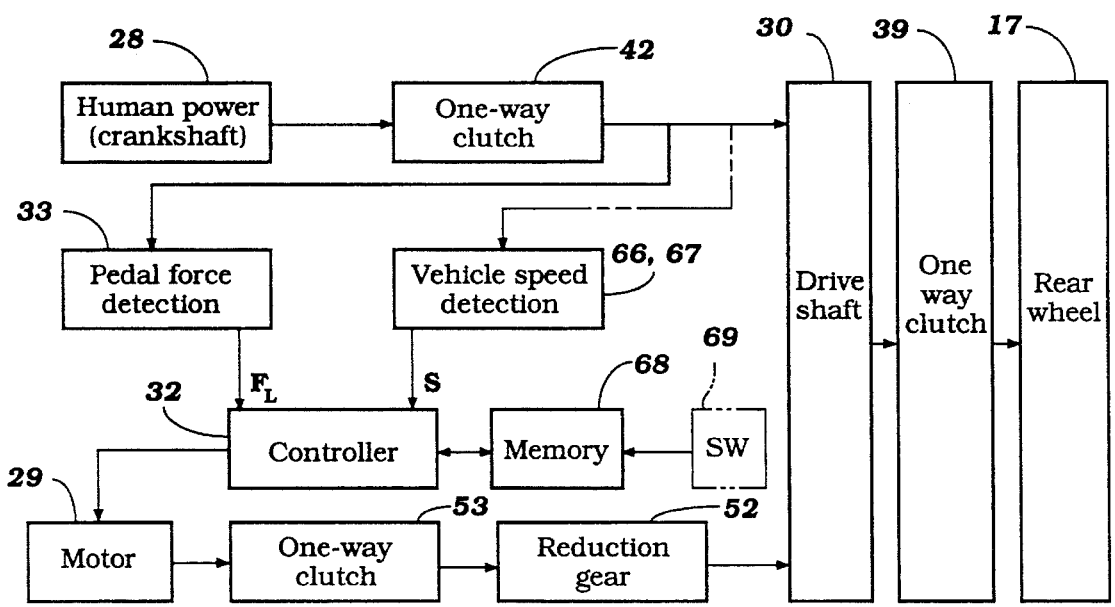
FIG. 2 is a partially schematic view showing the interrelationship of the various components of the system.

The details of the drive arrangement for driving the rear wheel 17 will now be described by particular reference to FIGS. 1 through 5, with FIG. 2 showing the relationship of the components in schematic form, while FIGS. 1 and 3–5 show the actual physical construction.

Figure 3:
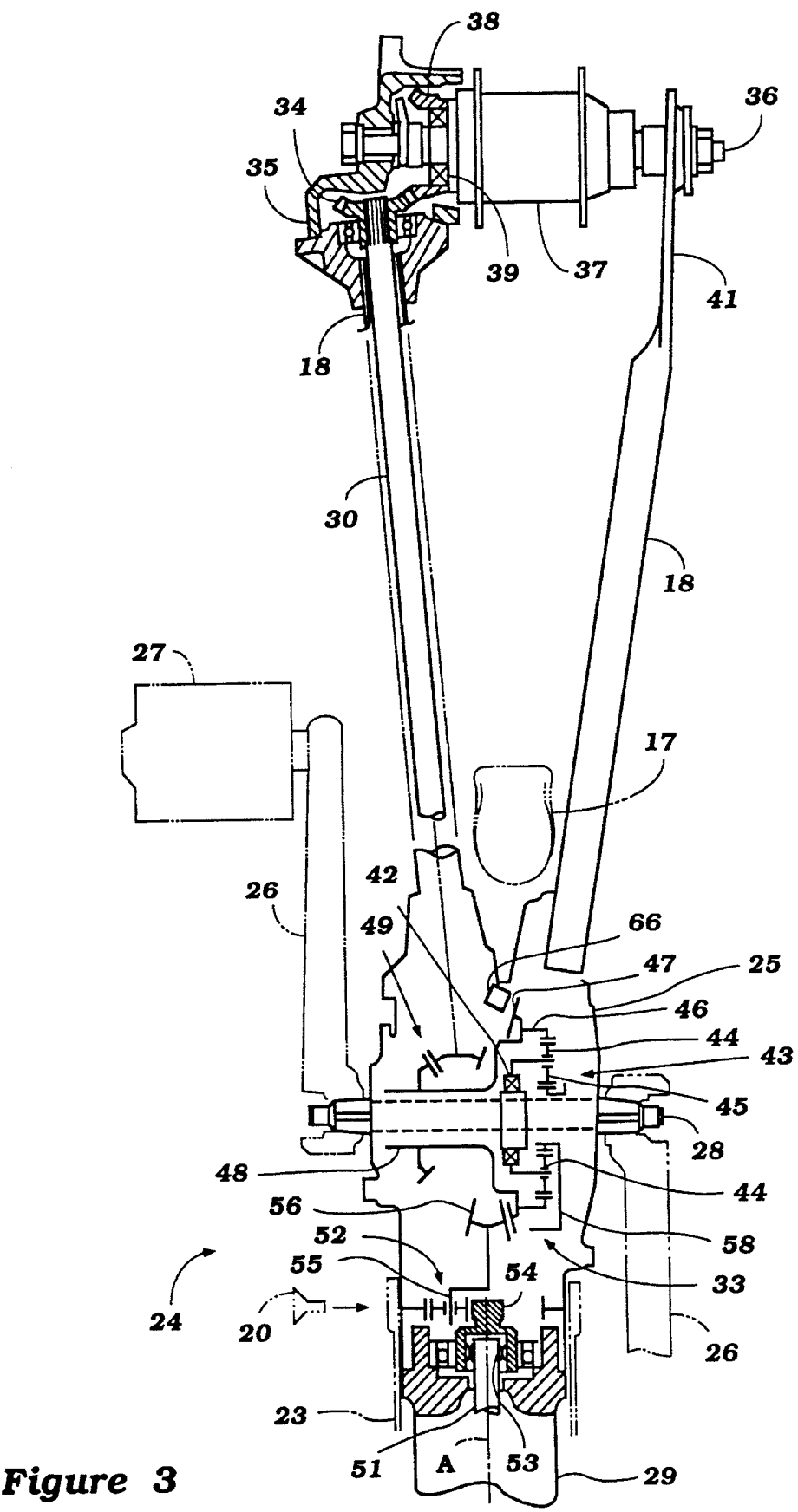
FIG. 3 is an enlarged cross sectional view taken generally along the line 3—3 of FIG. 1 and shows the driving mechanism and its interrelationship with the driven wheel.

It may be seen in FIG. 3, one of the back stays 18 is tubular in configuration and passes a drive shaft 30 which carries a bevel gear 34 at its rear end. This bevel gear 34 is contained within a housing 35 formed at the end of this side of the back stay 18 and which housing also supports an axle 36 of the rear wheel 17 in a fixed manner. The axle 36 journals a hub 37 which carries a driven bevel gear 38 which is enmeshed with the driving bevel gear 34 of the drive shaft 30. The driven bevel gear 38 is coupled by means of a one-way clutch 39 to the rear wheel hub 37 so as to drive the hub 37 and rear wheel 17. However, the one-way clutch 39 will permit overrunning during coasting so that the rear wheel 17 may coast freely relative to the drive shaft 30.

The back stay 18, at the opposite side from the drive shaft 30 is formed with a flattened portion 41 to which the other side of the axle 36 is affixed in any known manner.

The drive shaft 30 may be driven by the crankshaft 28 under manual power and by the electric motor 29 for power assist in the manner which will now be described. This construction still is described by reference to FIGS. 1 through 5.

For mechanical operation by the pedals 27, the crankshaft 28 is coupled by means of a one-way clutch 42 to a speed increasing planetary gear set, indicated generally by the reference numeral 43. Specifically, the way-one clutch 42 interconnects the crankshaft 28 to a planet carrier on which planet gears 44 are rotatably journalled. The planet gears 44 are enmeshed with a sun gear 45 that is affixed to the torque sensor 33 in a manner which will be described. The planet gears 44 further are engaged with a ring gear 46 which, in turn, is affixed to a bevel gear 47.

The bevel gear 47 is, in turn, affixed to a resulting force shaft 48 which is journalled around the crankshaft 28 and which has a bevel gear connection 49 for driving the drive shaft 30. Hence, rotation of the crankshaft 28 by operating the pedals 27 will effect driving of the drive shaft 30 through the one-way clutch 42 and planetary transmission 43 which, in turn, drives the resulting force shaft 48 and bevel gear transmission 49. The one-way clutch 42 will prevent driving of the crank assembly 28 by the motor 29.

Referring now to the electric motor drive 29 and the way in which the electric motor is coupled to the drive shaft 30, this construction also appears in FIGS. 1 through 5. The electric motor 29 is mounted within the frame 12 so that its output shaft 51 rotates about an axis "A" (FIGS. 3 & 5) which is disposed substantially midway of the transverse side of the frame assembly 12 and which extended perpendicularly to the axis of rotation of the crankshaft 28. The motor output shaft 51 drives a further planetary gear reduction set, indicated generally by the reference numeral 52 through a one-way clutch 53 which permits the drive to be transmitted, but which prevent driving of the motor shaft 51 when the motor 29 is not energized.

The planetary transmission 52 includes a sun gear 54 which is driven by the one-way clutch 53 and which is enmeshed with a plurality of planet gears carried on a planetary carrier 55. The planetary carrier 55 is, in turn, affixed to a bevel gear 56 which is enmeshed with the bevel gear 47 so as to also drive this bevel gear 47. The planet gears on the carrier 55 are also engaged with a fixed ring gear which is held to the case 25 in a suitable manner. The planetary transmission 52 is of the speed reducing type so that the bevel gear 56 will be driven at a lower speed than the electric motor drive shaft 51.

The pedal force sensor 33 will now also be described by reference to the same figures. This mechanism includes a lever 58 which is affixed to the sun gear 45 at one side of the assembly and which carries a pair of lugs 59 and 61. The lug 59 is adapted to engage, in one extreme position, a fixed stop 62 carried by the frame portion 23. The lug 61, on the other hand, is adapted to engage a second lever 63 which is affixed to the shaft of a potentiometer 64 and which, in turn, is engaged by a resilient damper 65, so that the rotation of the lever 63 and potentiometer 64 will indicate the amount of pedal force exerted by the operator on the crankshaft 28. This pedal force is then used, in the manner now to be described, so as to control the operation of the electric motor 29.

There are two additional components of the system which will be described and these components include a vehicle speed detector 66 which, in FIG. 3 is illustrated as being an inductive device that cooperates with the ring gear 47 so as to provide a speed signal indicative of speed of the bicycle 11. Alternatively, a front wheel mounted speedometer 67 (FIG. 1) can be employed. The system further includes a memory 68 which memorizes certain data as will be noted.

The system as thus far described may be considered to be the same as that shown in the co-pending application entitled "Bicycle With Electric Motor", Ser. No. 026,868, filed Mar. 5, 1993, in the names of, Nozomu Takata and Tatsuji Yokoyama, assigned to the Assignee hereof. This invention differs from the arrangement shown in the co-pending application in the way in which the controller 32 controls the output of the electric motor 29 for power assist. In the co-pending application, the power assist is generally constant in relation to pedalling force, that is, $F_M \div F_L = \eta$, the assist ratio. However, as has been noted above, this is not always desirable and in accordance with this invention, an arrangement is provided for varying the amount of electric motor assist in response to certain characteristics or conditions of the bicycle travel and in a first embodiment, now to be described, the assist ratio is varied in response to actual vehicle speed.

Figure 6:
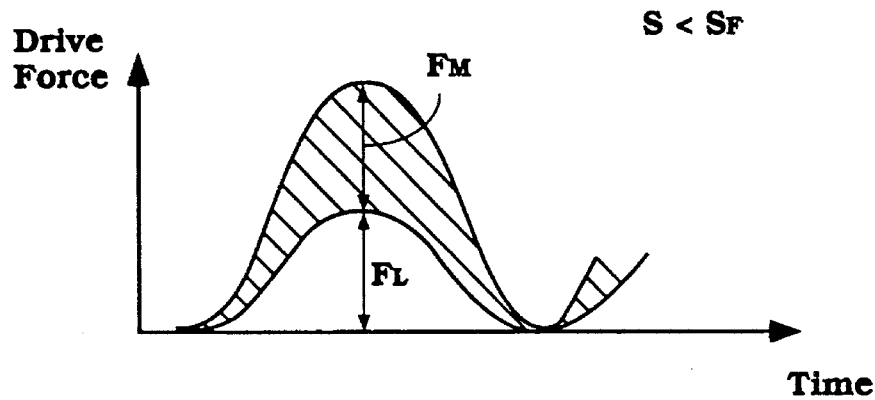
FIGS. 6, 7 and 8 are curves showing manual pedal force and electric power assist in relation to time or crank rotation under low speed, low end high speed and high speed conditions, respectively.
Figure 7:
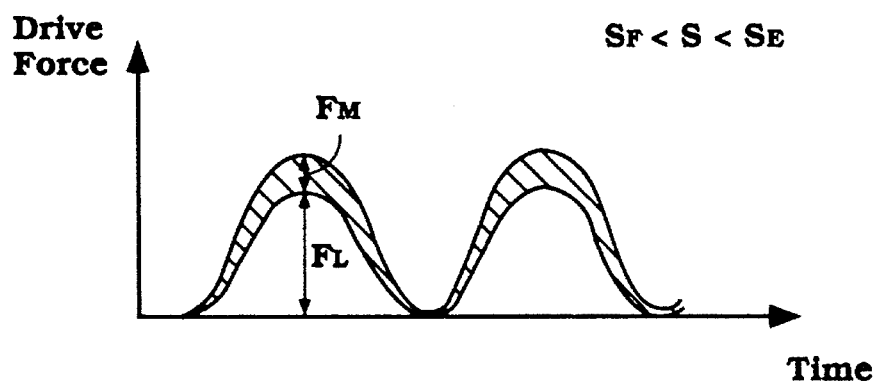

In the control as shown in this embodiment, the assist ratio $\eta$ is held constant when the speed of the bicycle S is less than a predetermined relatively high speed $S_F$. When this occurs, the assist $F_M$ will vary at the fixed ratio $\eta_0$ to the pedal force $F_L$ as shown in FIG. 6 and the system operates like the conventional prior art types of systems. However, as the speed of the bicycle S approaches a speed that is greater than the speed $S_F$, but is less than a higher speed $S_E$, then the assist ratio $\eta$ gradually decreases in a linear function as will be described later by reference to FIG. 9. Hence, when the speed is in this range as shown in FIG. 7, the electric motor assist $F_M$ will be less than that under the low speed condition as shown in FIG. 6 and over speed and the use of excess of electrical energy will be avoided.

Figure 8:
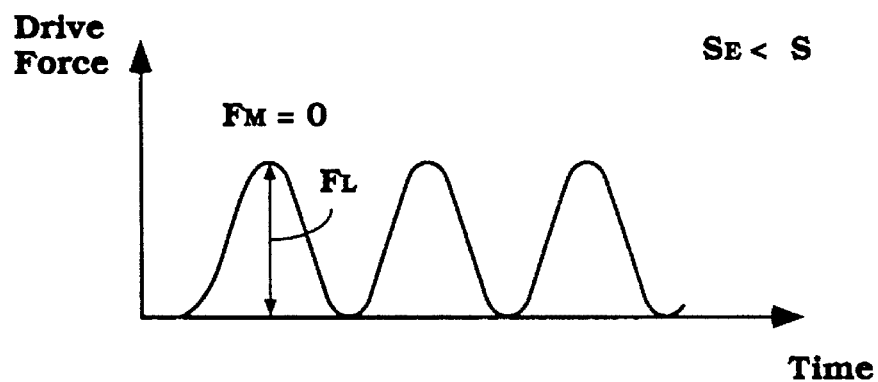

When the speed of the bicycle S is equal to or exceeds the speed $S_E$, then the controller 32 will cease any power assist and the total force applied to the driving wheel 17 will be equal to the pedal force $F_L$ as shown in FIG. 8.

Figure 9:
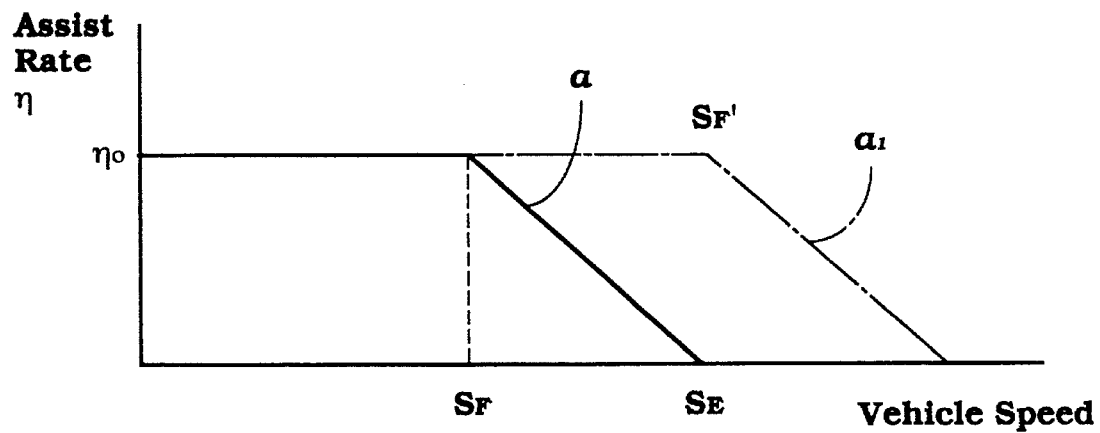
FIG. 9 is a graphical view showing two possible relationships of assist rate in relation to vehicle speed.
Figure 10:
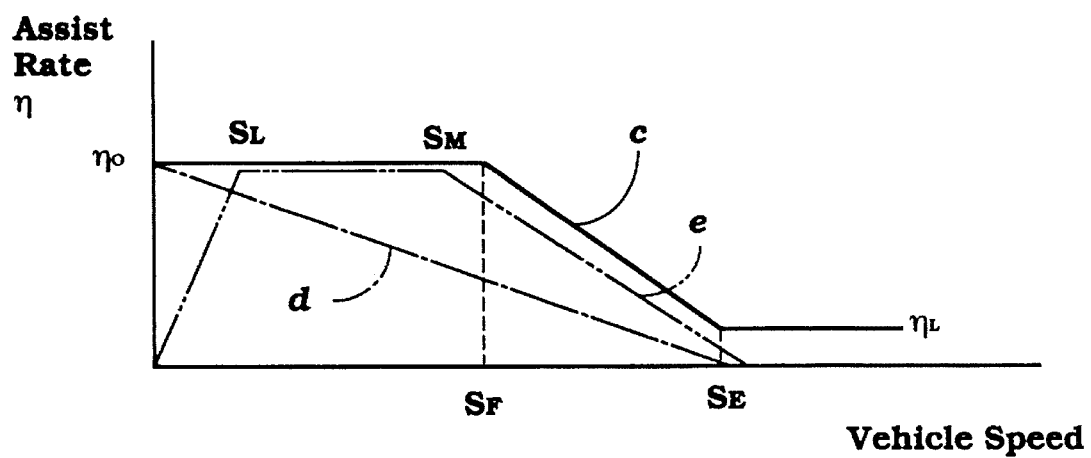
FIG. 10 is a graphical view showing other possible variations of assist rate in response to vehicle speed.

The way in which the assist ratio $\eta$ is varied in accordance with this embodiment, may be seen in FIG. 9 wherein it will be seen that the assist ratio $\eta$ is held constant at a value indicated by the point $\eta_0$ as long as the speed of the bicycle S is less than the speed $S_F$. However, when the speed reaches the speed $S_F$, then the assist ratio is decreased linearly as shown by the curve "a" until it reaches zero (0) at the speed $S_E$. In the illustrated embodiment shown by the solid line in FIG. 9, the bicycle S is designed so as to be operated at normal conditions. However, if it is desired to provide an arrangement that is designed primarily for high speed operation, then the speed $S_F$ can be increased to the speed $S_F$, so that the diminishing curve shown by the .— (dot/dash) line $a_1$ will occur at a higher speed. Either of the curves of FIG. 9 may be programmed suitably into the memory 68 (FIG. 2) so that the controller 32 will control the motor 29 in response to the pedal force $F_L$ and also the speed S. In addition to the type of relationship shown in FIG. 9, a wide variety of assist curves are possible and FIG. 10 shows some other embodiments. In these embodiments, the first of which is shown by the solid line curve "c", there is always provided some electric motor assist and the motor assist is maintained constant at the value $\eta_0$ until the speed $S_F$ and then is decreased linearly until the speed $S_E$. At this time, the power assist ratio $\eta$ is maintained at a somewhat lower value $\eta_L$ so that there will always be some assist for the pedalling force even at high speeds.

Another type of control is shown by the .— (dot/dash) curve in FIG. 10 and is identified by the curve "d". With this curve, there is never a constant assist ratio $\eta$ and the assist ratio varies downwardly from the ratio $\eta_0$ at starting until zero (0) assist ratio at the high speed $S_E$.

A further curve is shown by the ..— (dot/dot/dash) curve "e" in FIG. 10 and this shows a curve which more closely approximates actual feel of pedaling with a conventional bicycle. Under this curve, the assist ratio begins at zero (0) and increases gradually until a speed $S_L$. The pedal assist is then held constant until a somewhat lower speed than the speed $S_F$ such as the speed $S_M$ and then is gradually varied downwardly to zero (0) at the speed $S_E$. Thus, it should be readily apparent that the desired type of assist characteristics may be readily varied. In fact, the memory 68 may be provided with a plurality of curves such as the three curves of FIG. 10 with an operator switch 69 being provided so as to permit the operator to select the type of assist ratio he desires.

It has been previously noted that the vehicle speed sensor may either sense the condition of rotation of the ring gear 47 as by the sensor 66 of FIG. 3 or the rotational speed of the front wheel 16 as sensed by the sensor 67. The ring gear sensor has an advantage in conjunction with this invention in that when the operator is not pedaling and the bicycle is coasting, then the crankshaft 28 will not rotate and also the one way clutch 39 will insure that the drive shaft 30 is not driven so that the ring gear 47 will not rotate. As a result of this, no speed will be sensed by the speed sensor and no electric motor assist will occur. This will further reduce the consumption of electrically energy.

Also the invention has been described in conjunction with a shaft drive but it can be obviously employed in conjunction with a chain driven bicycle.

It should be thus apparent from the foregoing description that the described construction provides appropriate degrees of assist ratios to suit certain purposes and thus, affords a much better control than the prior art type of constructions wherein the assist ratio is maintained constant under all conditions. Of course, the foregoing description is that of preferred embodiments of the invention and various changes and modifications may be made without departing from the spirit and scope of the invention, as defined by the appended claims.

I claim:

1. An electrically assisted, manually powered vehicle having at least one driving wheel, an operator driven driving member to which an operator applies a force manually, transmission means coupling said driving member to said driving wheel for operator powered driving of said vehicle, force sensing means for sensing the force applied by said operator to said operator driven driving member and outputting a force signal indicative of the actual amount of force applied by the operator in driving the vehicle, an electric motor for exerting a driving force to said vehicle, means responsive to the output force signal of said force sensing means for supplying an amount of electrical power for operating said electric motor at a ratio related to said force signal for assisting the driving of said vehicle, a vehicle condition sensing device outputting a vehicle condition signal, and means for varying the ratio of electric motor assist relative to the force sensed by said force sensing means in response to the vehicle condition signal output by said vehicle condition sensing device.

2. An electrically assisted, manually powered vehicle as set forth in claim 1 wherein the vehicle condition sensing device senses speed.

3. An electrically assisted, manually powered vehicle as set forth in claim 2 wherein the amount of electric motor assist is maintained at a constant ratio until a predetermined speed and then is varied when the speed exceeds said predetermined speed.

4. An electrically assisted, manually powered vehicle as set forth in claim 3 wherein the electric motor assist ratio is reduced as the speed increases above the predetermined speed.

5. An electrically assisted, manually powered vehicle as set forth in claim 4 wherein there is a lower predetermined speed and the amount of electric motor assist is reduced as the speed falls below that lower predetermined speed.

6. An electrically assisted, manually powered vehicle as set forth in claim 2 wherein the electric motor assist is varied from zero (0) assist ratio to a constant assist ratio as the speed of the vehicle increases from a stopped condition to a predetermined low speed.

7. An electrically assisted, manually powered vehicle as set forth in claim 6 wherein the electric motor assist ratio is reduced when the speed exceeds a predetermined high speed.

8. An electrically assisted, manually powered vehicle as set forth in claim 7 wherein the constant assist ratio is maintained between the predetermined low speed and the predetermined high speed.

9. An electrically assisted, manually powered vehicle as set forth in claim 2 wherein the electric motor assist is discontinued when the speed of the vehicle exceeds a predetermined high speed.

10. An electrically assisted, manually powered vehicle as set forth in claim 1 further including operator controlled means for selectively varying the variation in the amount of electric motor assist in response to the sensed vehicle condition.

11. An electrically assisted, manually powered vehicle as set forth in claim 10 wherein the operator may select any of a plurality of ratios of assist in relation to a given vehicle condition.

12. An electrically assisted, manually powered vehicle as set forth in claim 1 wherein the operator driven driving member comprises a pedal operated crank and wherein the force sensing means senses the force exerted at the pedal operated crank.

13. An electrically assisted, manually powered vehicle as set forth in claim 12 wherein the vehicle condition sensing device senses speed.

14. An electrically assisted, manually powered vehicle as set forth in claim 13 wherein the amount of electric motor assist is maintained at a constant ratio until a predetermined speed and then is varied when the speed exceeds said predetermined speed.

15. An electrically assisted, manually powered vehicle as set forth in claim 14 wherein the electric motor assist ratio is reduced as the speed increases above the predetermined speed.

16. An electrically assisted, manually powered vehicle as set forth in claim 15 wherein there is a lower predetermined speed and the amount of electric motor assist is reduced as the speed falls below the lower predetermined speed.

17. An electrically assisted, manually powered vehicle as set forth in claim 13 wherein the electric motor assist is varied from zero (0) assist ratio to a constant assist ratio as the speed of the vehicle increases to a predetermined low speed.

18. An electrically assisted, manually powered vehicle as set forth in claim 17 wherein the electric motor assist ratio is also reduced when the speed exceeds a predetermined high speed.

19. An electrically assisted, manually powered vehicle as set forth in claim 18 wherein the constant assist ratio is maintained between the predetermined low speed and the predetermined high speed.

20. An electrically assisted, manually powered vehicle as set forth in claim 13 wherein the electric motor assist is discontinued when the speed of the vehicle exceeds a predetermined high speed.

21. An electrically assisted, manually powered vehicle as set forth in claim 4 wherein the predetermined speed is a first predetermined speed and the electric motor assist ratio is reduced until the speed reaches a second predetermined speed higher than said first predetermined speed and then maintains the electric motor assist ratio constant as the speed increases above said second predetermined speed.

22. An electrically assisted, manually powered vehicle as set forth in claim 15 wherein the predetermined speed is a first predetermined speed and the electric motor assist ratio is reduced until the speed reaches a second predetermined speed higher than said first predetermined speed and then maintains the electric motor assist ratio constant as the speed increases above said second predetermined speed.

23. An electrically assisted, manually powered vehicle as set forth in claim 2 wherein the electric motor assist ratio is decreased as the speed increases.

24. An electrically assisted, manually powered vehicle as set forth in claim 13 wherein the electric motor assist ratio is decreased as the speed increases.

* * * * *